Jan. 16, 1923.

D. J. PALLONE.
WINDMILL.
FILED MAR. 18, 1922.

1,442,290.

Inventor
Domenico J. Pallone,

By Watson E. Coleman
Attorney

Patented Jan. 16, 1923.

1,442,290

UNITED STATES PATENT OFFICE.

DOMENICO J. PALLONE, OF LA JOSE, PENNSYLVANIA.

WINDMILL.

Application filed March 18, 1922. Serial No. 544,889.

*To all whom it may concern:*

Be it known that I, DOMENICO J. PALLONE, a citizen of the United States, residing at La Jose, in the county of Clearfield and State of Pennsylvania, have invented certain new and useful Improvements in Windmills, of which the following is a specification, reference being had to the accompanying drawings.

It is the purpose of the present invention to provide a windmill including a frame having thereon a body representing a bird including oscillatory or flapping wings, with operating connections with the wind wheel shaft, for the purpose of giving the impression that the bird is flying.

Another purpose is the provision of an audible signal for signalling that the wind is blowing and the mill is operating. For instance a fan including a fan casing, with operating connections between the fan and the casing and the wind wheel shaft, for sounding or blowing a whistle carried by the casing which houses the fan.

It is the purpose of this invention to mount the whistle and its fan shaft so that it may project from the bill of the bird's body, which is mounted upon the rotating windmill frame.

It is to be understood that the particulars herein given are in no way limitative and that while still keeping within the scope of the invention, any desired modifications of detail and desired proportions may be made in the apparatus according to circumstances.

The invention comprises further features and combination of parts, as will be hereinafter set forth, shown in the drawings and claimed.

In the drawings:—

Figure 1:
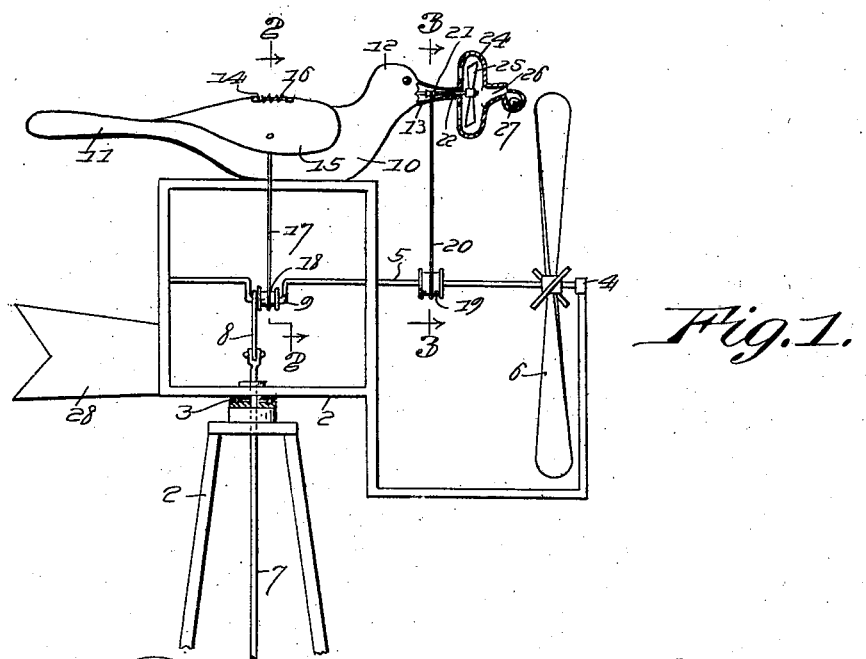
Figure 1 is a view in elevation of the upper portion of a windmill, showing a mounting for the rotating windmill frame in section, and also showing the whistle and the fan casing in section.
Figures 2, 3:
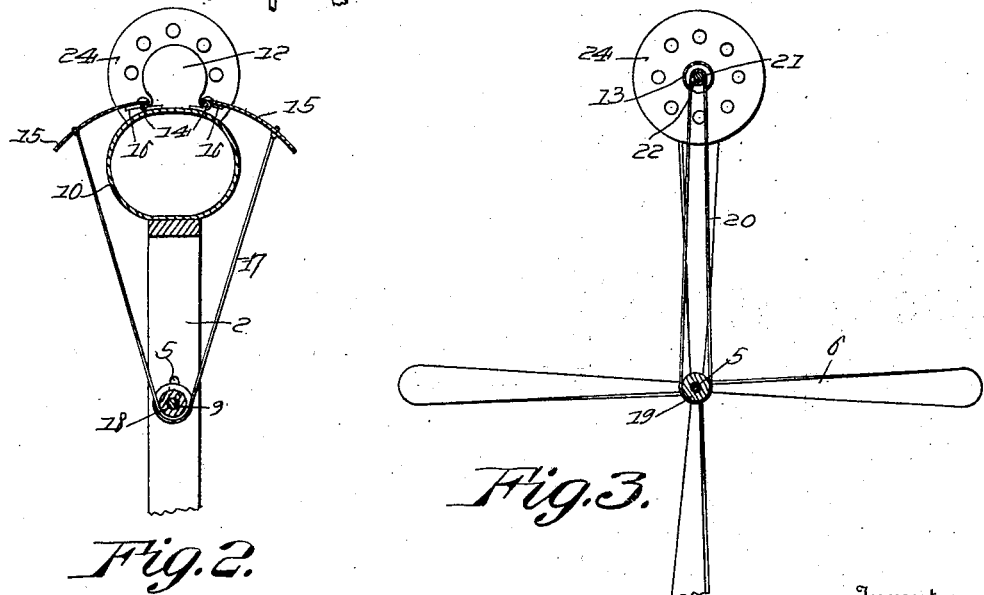
Figure 2 is a sectional view on line 2—2 of Figure 1.
Figure 3 is a sectional view on line 3—3 of Figure 1.

Referring to the drawings, 1 designates the base frame of the windmill, and 2 denotes a rotating or rocking frame, which is mounted on the base frame, through the medium of an anti-frictional ball bearing mounting 3. The frame 2 is of rectangular form, though it may be any other suitable shape, and mounted in suitable bearings thereof as at 4 is a wind wheel shaft 5 provided with a wind wheel 6.

A suitable pump actuating shaft or rod 7 extends through the frame 1, and has its upper end connected to the wind wheel shaft 5 by means of a pitman 8. In other words the shaft 5 has a crank 9 to which the pitman 8 is connected, so that when the shaft 5 is rotated, reciprocating movements will be imparted to the shaft 7.

A body 10 which may be any suitable shape preferably representing a bird's body is mounted upon the frame 2, and comprises a tail piece 11, a head 12 and bill 13. Hinged to the body 10 as at 14 are flapping wings 15. The hinge connections include suitable springs 16, for the purpose of flapping the wings upwardly. Connected to the under parts of the wings are the ends of a cable 17, which is folded upon itself, and the fold or crotch of the cable engages a pulley 18, which is mounted on the crank 9 of the shaft 5. Obviously the springs 16 tend to hold the wings as inclining upwardly and laterally from the body 10. However as the crank 9 moves downwardly in its rotating movements, the pulley 18 pulls upon the cable 17 equally upon both sides thereof, causing the wings to move downwardly, then when the crank 9 rotates in an upward direction, thereby releasing the tension upon the cable 17, both sides thereof equally, the tension of the springs 16 moves the wings upwardly. Obviously when the shaft 5 is rotating rapidly, the wings will flap, causing the impression that the body, representing that of a bird, is flying.

The conventional wind wheel 6, which is mounted upon the shaft 5 is designed to be propelled by means of the wind, and mounted upon the shaft 5 is a pulley 19, about which a belt 20 travels. This belt 20 in turn travels about a pulley 21, which is mounted on a shaft 22, mounted in suitable bearings of the bill 13 of the body, which represents that of a bird. A fan casing 24 is carried by and connected to the bill 13 in any suitable manner, and movable in the casing 24 and mounted on the shaft 22 is a fan 25. Therefore when the shaft 22 rotates, through the medium of the shaft 5, sufficient air is drawn into the fan casing, and discharged therefrom in a relatively steady blast, which passes outwardly through the tubular extension 26, projecting from the outer face of the fan casing 24. This tubular extension 26 terminates in a conventional form of whistle 27.

The frame 2 is also provided with a tail piece 28, which acts to shift the frame 2 according to the direction of the wind.

In the operation, the wind wheel imparts movement to the shaft 5, which in turn actuates the pump rod and wings of the body representing the bird. The shaft 5 also imparts movement to the shaft 22, and thereby causing the fan to draw air into the fan casing and discharge it for the purpose of blowing or sounding the whistle, thereby giving an audible signal that the wind wheel is operating.

The invention having been set forth, what is claimed is:—

1. In a device for the purpose indicated, a rotating windmill frame carrying a wind wheel shaft, a body representing that of a bird mounted upon said frame and provided with spring tensioned oscillatory wings, and means operatively connecting the wind wheel shaft and the wings, for causing oscillatory movements to be imparted to the wings, said operating connections comprising a crank carried by the wind wheel shaft, including a pulley on said crank, and a cable looped upon itself and engaging the pulley of the crank and having its ends connected to the wings.

2. In a device for the purpose indicated, a rotating windmill frame, including a wind wheel shaft and provided with a pulley, a fan shaft including a fan carried by the frame and spaced in parallelism with the first shaft, a casing for said fan and provided with a whistle on one face thereof for receiving a steady blast of air from the fan, for sounding the whistle and thereby giving an audible signal, and means operatively connecting said pulley and the fan shaft.

3. In a device for the purpose indicated, a rotatable wind mill frame, including a wind wheel shaft, a body representing that of a bird being mounted upon said frame and provided with movable wings, a shaft mounted in bearings in the bill of the body which represents a bird and having a fan, means operatively connecting the fan carrying shaft and the wind wheel shaft, and a whistle receiving a steady blast from the fan, and a casing for the fan and carrying said whistle.

In testimony whereof I hereunto affix my signature.

DOMENICO J. PALLONE.